US010851186B2

(12) United States Patent
Li et al.

(10) Patent No.: US 10,851,186 B2
(45) Date of Patent: Dec. 1, 2020

(54) AQUEOUS POLYMER DISPERSION

(71) Applicants: Dow Global Technologies LLC, Midland, MI (US); Rohm and Haas Company, Collegeville, PA (US)

(72) Inventors: Yan Li, Shanghai (CN); Junyu Chen, Shanghai (CN); Tao Wang, Shanghai (CN); Zhi Juan Gong, Shanghai (CN); James C. Bohling, Lansdale, PA (US); Cheng Shen, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/490,977

(22) PCT Filed: Apr. 24, 2017

(86) PCT No.: PCT/CN2017/081588
§ 371 (c)(1),
(2) Date: Sep. 4, 2019

(87) PCT Pub. No.: WO2018/195680
PCT Pub. Date: Nov. 1, 2018

(65) Prior Publication Data
US 2020/0031956 A1     Jan. 30, 2020

(51) Int. Cl.
| | | |
|---|---|---|
| *C08F 2/22* | (2006.01) |
| *C09D 7/40* | (2018.01) |
| *C08F 212/08* | (2006.01) |
| *C08F 220/06* | (2006.01) |
| *C08F 220/14* | (2006.01) |
| *C08F 230/02* | (2006.01) |
| *C08L 71/02* | (2006.01) |
| *C09D 5/02* | (2006.01) |
| *C08F 220/18* | (2006.01) |

(52) U.S. Cl.
CPC .............. *C08F 2/22* (2013.01); *C08F 212/08* (2013.01); *C08F 220/06* (2013.01); *C08F 220/14* (2013.01); *C08F 230/02* (2013.01); *C08L 71/02* (2013.01); *C09D 5/022* (2013.01); *C09D 7/66* (2018.01); *C08F 220/1804* (2020.02)

(58) Field of Classification Search
USPC ........................................................ 524/458
See application file for complete search history.

(56) References Cited

U.S. PATENT DOCUMENTS

| | | |
|---|---|---|
| 6,800,682 B1 | 10/2004 | Windhoevel et al. |
| 7,189,773 B2 | 3/2007 | Saiki et al. |
| 2003/0209695 A1 | 11/2003 | Tsuzuki et al. |
| 2013/0035430 A1 | 2/2013 | Li et al. |

FOREIGN PATENT DOCUMENTS

| | | |
|---|---|---|
| CA | 2225423 A1 | 1/1997 |
| JP | 6248038 B2 | 12/2017 |
| WO | 2005014661 A3 | 6/2005 |
| WO | 2013016402 A1 | 1/2013 |

*Primary Examiner* — Terressa Boykin
(74) *Attorney, Agent, or Firm* — Karl E. Stauss; Cantor Colburn LLP

(57) ABSTRACT

An aqueous polymer dispersion, a process of preparing the aqueous polymer dispersion, and an aqueous coating composition comprising the aqueous polymer dispersion and providing coatings with improved water repellency and/or improved hydrophobic stain resistance without compromising hydrophilic stain resistance.

11 Claims, No Drawings

AQUEOUS POLYMER DISPERSION

FIELD OF THE INVENTION

The present invention relates to an aqueous polymer dispersion and an aqueous coating composition comprising the same.

INTRODUCTION

Stain resistance including hydrophobic stain resistance and hydrophilic stain resistance, is one of the key performance requirements for coating films. Stain resistance is a coating film's resistance to stains, including its resistance to being wetted by stains, its resistance to being adhered by stains on the coating film, and how easily stains can be removed.

Beading effect which is also called water repellency is achieved by adding additives to reduce surface tension of coating films. In the coating industry, one of commonly used additives to improve water repellency is wax. Wax tends to migrate to the surface of dry coating films and reduces the surface tension, thereby improving water repellency. US 2013/0035430 A1 relates to an aqueous coating composition having a fraction of critical pigment volume concentration of from 35% to 110%, and comprising: (i) pigment composition, including 15 wt. %-100 wt. %, in percentage by weight based on the dry weight of the pigment composition, polymer-encapsulated pigment; and 0-85 wt. %, in percentage by weight based on the dry weight of the pigment composition, un-encapsulated pigment; and (ii) 0.01 wt. %-5 wt. %, in percentage by dry weight based on the wet weight of the aqueous coating composition, at least one paraffin wax emulsion. However, the addition of the wax tends to compromise the hydrophobic stain resistance of coating films. Addition of surfactants is useful to increase the hydrophilicity of the surface of coating films, thus improve hydrophobic stain resistance, but usually hurts coatings' hydrophilic stain resistance and water repellency.

It is therefore desired to provide an aqueous coating composition that can provide coating films made therefrom with improved water repellency and/or improved hydrophobic stain resistance without compromising hydrophilic stain resistance.

SUMMARY OF THE INVENTION

The present invention provides a novel aqueous polymer dispersion by combining a poly(butylene oxide) polymer with a specific emulsion polymer. An aqueous coating composition comprising such aqueous polymer dispersion provides coatings with improved water repellency and/or improved hydrophobic stain resistance without compromising hydrophilic stain resistance.

In a first aspect, the present invention is a process of preparing an aqueous polymer dispersion. The process comprises:

polymerization of a monomer composition in an aqueous medium in the presence of a poly(butylene oxide) polymer to obtain an emulsion polymer, wherein the monomer composition comprises an ethylenically unsaturated phosphorous-containing monomer, and wherein the poly(butylene oxide) polymer has the structure of formula I,

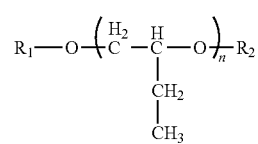

(I)

wherein $R_1$ and $R_2$ each independently represents a hydrogen atom or a straight, branched or cyclic, saturated or unsaturated alkyl group having 1 to 22 carbon atoms; and n is an integer of from 5 to 300.

In a second aspect, the present invention is an aqueous polymer dispersion obtained from the process of the first aspect.

In a third aspect, the present invention is an aqueous polymer dispersion, comprising:

an emulsion polymer comprising, as polymerized units, an ethylenically unsaturated phosphorous-containing monomer; and a poly(butylene oxide) polymer having the structure of formula I,

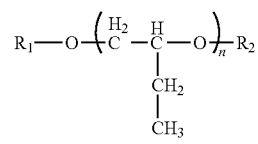

(I)

wherein $R_1$ and $R_2$ each independently represents a hydrogen atom or a straight, branched or cyclic, saturated or unsaturated alkyl group having 1 to 22 carbon atoms; and n is an integer of from 5 to 300.

In a fourth aspect, the present invention is an aqueous coating composition comprising the aqueous polymer dispersion of the second or third aspect.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein, can be measured by various techniques including, for example, differential scanning calorimetry ("DSC") or calculation by using a Fox equation. For example, $T_g$ of an emulsion polymer comprising polymerized units of Monomers a, b, and c, is determined according to the following Fox equation:

$$1/T_g(\text{calc.}) = w(M_a)/T_g(M_a) + w(M_b)/T_g(M_b) + w(M_c)/T_g(M_c)$$

wherein $T_g$(calc.) refers to the glass transition temperature calculated for the polymer; $T_g(M_a)$, $T_g(M_b)$, and $T_g(M_c)$ refer to $T_g$ of the homopolymer of Monomer a, the homopolymer of Monomer b, and the homopolymer of Monomer c, respectively; and $w(M_a)$, $w(M_b)$, and $w(M_c)$ refer to the weight fraction of Monomer a, Monomer b, and Monomer c used for preparing the emulsion polymer, based on the weight of total monomers, respectively. The glass transition temperature of homopolymer may be found, for example, in "Polymer Handbook", edited by J. Brandrup and E. H. Immergut, Interscience Publishers.

"Aqueous polymer dispersion" in the present invention means polymer particles dispersed in an aqueous medium. "Aqueous medium" in the present invention means water and from 0 to 30%, by weight based on the weight of the medium, of water-miscible compound(s) such as, for example, alcohols, glycols, glycol ethers, glycol esters, and the like.

The aqueous polymer dispersion of the present invention may comprise
an emulsion polymer comprising, as polymerized units, an ethylenically unsaturated phosphorous-containing monomer; and
a poly(butylene oxide) polymer having the structure of formula I,

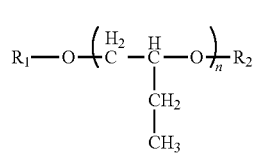

wherein $R_1$ and $R_2$ each independently represents a hydrogen atom or a straight, branched or cyclic, saturated or unsaturated alkyl group having 1 to 22 carbon atoms; and n is an integer of from 5 to 300.

The aqueous polymer dispersion of the present invention comprises the emulsion polymer. The emulsion polymer may be prepared by polymerization, e.g., emulsion polymerization, of a monomer composition in an aqueous medium in the presence of a poly(butylene oxide) polymer.

The monomer composition useful in the present invention may comprise one or more ethylenically unsaturated phosphorous-containing monomers. The ethylenically unsaturated phosphorous-containing monomers can be dihydrogen phosphate esters of an alcohol in which the alcohol contains or is substituted with a polymerizable vinyl or olefinic group. The ethylenically unsaturated phosphorous-containing monomer may include phosphoalkyl (meth)acrylates such as phosphoethyl (meth)acrylate, phosphopropyl (meth) acrylate, phosphobutyl (meth)acrylate, salts thereof, and mixtures thereof; $CH_2=C(R)-C(O)-O-(R_pO)_n-P(O)(OH)_2$, wherein $R=H$ or $CH_3$ and $R_p=$alkyl, such as SIPOMER PAM-100, SIPOMER PAM-200, and SIPOMER PAM-300 all available from Solvay; phosphoalkoxy (meth) acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred ethylenically unsaturated phosphorus-containing monomer is selected from the group consisting of phosphoethyl (meth)acrylate, phosphopropyl (meth)acrylate, phosphobutyl (meth)acrylate, and salts thereof; more preferably, phosphoethyl methacrylate (PEM). The ethylenically unsaturated phosphorous-containing monomer may be present, by weight based on the total weight of the monomer composition, 0.1% or more, 0.5% or more, or even 1% or more, and at the same time, 10% or less, 5% or less, or even 3.5% or less.

The monomer composition useful in the present invention may also comprise one or more ethylenically unsaturated ionic monomers carrying at least one functional group selected from the group consisting of carboxyl, carboxylic anhydride, sulphonate, and sulphate. "Ionic monomers" herein refer to monomers that bear an ionic charge between pH=1-14. Suitable ethylenically unsaturated ionic monomers carrying at least one functional group may include, for example, α, β-ethylenically unsaturated carboxylic acids or anhydrides thereof such as (meth)acrylic acid, itaconic acid (IA), fumaric acid, (meth)acrylic anhydride, maleic anhydride, or mixtures thereof; sodium styrene sulfonate (SSS), sodium vinyl sulfonate (SVS), 2-acrylamido-2-methylpropanesulfonic acid (AMPS), or mixtures thereof. Preferred ethylenically unsaturated ionic monomers carrying at least one functional group are selected from the group consisting of sodium styrene sulfonate, acrylic acid, and methacrylic acid. The monomer composition may comprise, by weight based on the total weight of the monomer composition, 0 or more, 0.1% or more, 0.2% or more, or even 0.3% or more, and at the same time, 50% or less, 10% or less, 5% or less, or even 3% or less, of the ethylenically unsaturated ionic monomer carrying at least one functional group.

The monomer composition useful in the present invention may also comprise one or more monoethylenically unsaturated nonionic monomers. "Nonionic monomers" herein refers to monomers that do not bear an ionic charge between pH=1-14. Suitable monoethylenically unsaturated nonionic monomers may include, for example, alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, or combinations thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); vinyl aromatic monomers including styrene and substituted styrene such as .alpha.-methyl styrene, p-methyl styrene, t-butyl styrene, vinyltoluene, or mixtures thereof; butadiene; α-olefins such as ethylene, propylene, and 1-decene; vinyl acetate, vinyl butyrate, vinyl versatate and other vinyl esters; glycidyl (meth)acrylate; or combinations thereof. Preferred monoethylenically unsaturated nonionic monomers are selected from the group consisting of methyl methacrylate, ethyl acrylate, butyl acrylate, 2-ethylhexyl acrylate, and styrene. The monomer composition may comprise, by weight based on the total weight of the monomer composition, 50% or more, 60% or more, 90% or more, or even 95% or more, and at the same time, 99.5% or less, 99% or less, or even 98% or less, of the monoethylenically unsaturated nonionic monomers.

The monomer composition useful in the present invention may further comprise one or more multiethylenically unsaturated monomers. Suitable multiethylenically unsaturated monomers may include alkylene glycol diacrylates and dimethacrylates such as, for example, ethylene glycol di(meth)acrylate, butylene glycol di(meth)acrylate, 1,1,1-trimethylol propane di(meth)acrylate, or pentaerythritol trimethacrylate; divinyl benzene, vinyl (meth)acrylate; allyl(meth) acrylate, N, N-methylene bisacrylamide, and the like; or mixtures thereof. The monomer composition may comprise, by weight based on the total weight of the monomer composition, 0 or more, 0.1% or more, or even 0.2% or more, and at the same time, 5% or less, 4% or less, or even 3% or less, of the multiethylenically unsaturated monomer.

Total weight concentration of the monomers described above in the monomer composition for preparing the emulsion polymer may be equal to 100%. The emulsion polymer may comprise, as polymerized units, one or more ethylenically unsaturated phosphorous-containing monomers described above. The emulsion polymer may further comprise, as polymerized units, one or more ethylenically unsaturated ionic monomers carrying at least one functional group, one or more monoethylenically unsaturated nonionic monomers, one or more multiethylenically unsaturated monomers, or mixtures thereof. These monomers are as described above in the monomer composition. The amount of each of these monomers, as polymerized units in the emulsion polymer, based on the solids weight of the emulsion polymer is substantially the same as the above described dosage of such monomer based on the total weight of the monomer composition. Types and levels of the monomers described above may be chosen to provide the obtained emulsion polymer with a glass transition temperature ($T_g$) suitable for different applications. The emulsion polymer may have a $T_g$ of from −60° C. to 100° C., from −20° C. to 50° C., from −10° C. to 30° C.

The aqueous polymer dispersion of the present invention also comprises one or more poly(butylene oxide) polymers. The poly(butylene oxide) polymer useful in the present invention may have the structure of formula I,

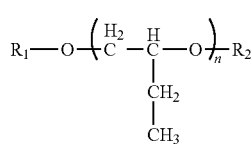

wherein $R_1$ and $R_2$ each independently represents a hydrogen atom or a straight, branched or cyclic, saturated or unsaturated alkyl group having 1 to 22 carbon atoms, and n is an integer of from 5 to 300. $R_1$ and $R_2$ each independently can be a straight, branched or cyclic, saturated or unsaturated alkyl group having from 1 to 22, from 1 to 10, or from 1 to 6 carbon atoms, for example, methyl, ethyl, phenyl. Preferred $R_1$ and $R_2$ are H. n in formula (I) can be from 5 to 300, from 15 to 150, or from 25 to 110.

The poly(butylene oxide) polymer useful in the present invention may have a molecular weight of 400 or more, 700 or more, 800 or more, 900 or more, 1,000 or more, or even 2,000 or more, and at the same time, 20,000 or less, 15,000 or less, 10,000 or less, 8,000 or less, or even 6,000 or less. Molecular weight herein refers to weight average molecular weight determined by Gel Permeation Chromatography (GPC) as described in the Examples section below.

The poly(butylene oxide) polymer may be present in an amount of 1.5% by weight or more, 2% by weight or more, 3% by weight or more, 4% by weight or more, or even 5% by weight or more, and at the same time, 30% by weight or less, 20% by weight or less, 15% by weight or less, 12% by weight or less, or even 10% by weight or less, based on the total weight of the monomer composition (i.e., the solids weight of the emulsion polymer).

The aqueous polymer dispersion useful in the present invention may comprise particles having an average particle size of from 30 to 500 nanometers (nm), from 50 to 300 nm, or from 80 to 200 nm. The particle size herein refers to volume average particle size and may be measured by a Brookhaven BI-90 Plus Particle Size Analyzer.

The aqueous polymer dispersion of the present invention may be prepared by polymerization, preferably emulsion polymerization, of the monomer composition described above. The process of preparing the aqueous polymer dispersion may comprise polymerization of the monomer composition in an aqueous medium in the presence of the poly(butylene oxide) polymer. The monomer composition may be added neat or as an emulsion in water; or added in one or more additions or continuously, linearly or nonlinearly, over the reaction period of preparing the emulsion polymer. The poly(butylene oxide) polymer may be added prior to or during the polymerization of the monomer composition, or combinations thereof. The poly(butylene oxide) polymer may be added into the monomer composition, or added into a polymer seed (for example, a polystyrene seed) to be shot into a reactor or be dispersed in the monomer composition. In one embodiment, the poly(butylene oxide) polymer is mixed with the monomer composition prior to polymerization of the monomer composition.

Temperature suitable for polymerization of the monomer composition may be lower than 100° C., in the range of from 30 to 95° C., or in the range of from 50 to 92° C. Multistage emulsion polymerization using the monomer composition described above can be used, which at least two stages are formed sequentially, and usually results in the formation of the multistage polymer comprising at least two polymer compositions.

In the polymerization of the monomer composition, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of the monomer composition. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization of the monomer composition, a surfactant may be used. The surfactant may be added prior to or during the polymerization of the monomers, or combinations thereof. A portion of the surfactant can also be added after the polymerization. These surfactants may include anionic and/or nonionic emulsifiers. The surfactants can be reactive surfactants, e.g., polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The surfactant used is usually from 0 to 10%, from 0.5% to 3% by weight, or from 0.8% to 1.5%, by weight based on the total weight of the monomer composition.

In the polymerization process of the monomer composition, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer. The chain transfer agent may be used in an amount of from 0% to 5%, from 0.05% to 1%, or from 0.1% to 0.3%, by weight based on the total weight of the monomer composition.

After completing the polymerization process of the monomer composition, the obtained aqueous polymer dispersion may be neutralized by one or more bases to a pH value, for example, at least 7, from 7 to 10, or from 8 to 9. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. The aqueous polymer dispersion of the present invention may have a solids content of from 20% to 70% by weight or from 40% to 60% by weight.

The aqueous polymer dispersion of the present invention is stable, for example, the aqueous polymer dispersion shows no bleed out of the poly(butylene oxide) polymer on the surface of the aqueous polymer dispersion observed by the naked eye, after storage at room temperature (23±2° C.) for 7 days or longer, 14 days or longer, one month or longer, two months or longer, or even three months or longer; or after heatage at 50° C. for 10 days. The aqueous polymer dispersion of the present invention is useful for use in applications where properties including water repellency, hydrophilic stain resistance and hydrophobic stain resistance are desirable. Particularly, the aqueous polymer dispersion can provide coatings with improved water repellency and/or improved hydrophobic stain resistance without compromising hydrophilic stain resistance, as compared to incumbent aqueous polymer dispersions that do not comprise the poly(butylene oxide) polymer or the emulsion polymer described above.

The present invention also relates to an aqueous coating composition comprising the aqueous polymer dispersion described above or obtained from the process of preparing the aqueous polymer dispersion. The aqueous polymer dispersion may be present, by solids weight based on the total weight of the aqueous coating composition, in an amount of from 5% to 35%, from 7% to 30%, or from 10% to 25%.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form. The aqueous coating composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 20% to 75%, from 30% to 65%, or from 35% to 60%. PVC of a coating composition may be determined according to the following equation:

$$PVC = \frac{\text{pigment volume} + \text{extender volume}}{\text{pigment volume} + \text{extender volume} + \text{binder volume}} * 100\%$$

The aqueous coating composition of the present invention may comprise one or more matting agents. "Matting agents" herein refer to any inorganic or organic particles that provide matt effect. The matting agents may be selected from silica matting agents, diatomate, polyurea matting agents, polyacrylate, polyethylene, polytetrafluoroethene, or mixtures thereof. Suitable commercially available matting agents may include, for example, CILITE 499 available from World Minerals Co. Ltd, ACEMATT TS-100 and ACEMATT OK520 silica matting agents both available from Evonik, DEUTERON MK polyurea matting agent available from Deuteron, micronized wax additives CERAFLOUR 929 and CERAFLOUR 920 both available from BYK, SYLOID Silica 7000 matting agent available from Grace Davison; or mixtures thereof. The matting agent may be present, by solids weight based on the total weight of the aqueous coating composition, from 0 to 10%, from 0.1% to 8%, or from 0.5% to 5%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, generally from 0.05% to 2%, from 0.1% to 1.5%, or from 0.2% to 1%.

The aqueous coating composition of the present invention may further comprise one or more thickeners (also known as "rheology modifiers"). The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferred thickener is based on HEUR. The thickener may be present, by weight based on the total weight of the aqueous coating composition, from 0.1% to 4%, from 0.2% to 3%, or from 0.3% to 2%.

The aqueous coating composition of the present invention may further comprise water. The concentration of water may be, by weight based on the total weight of the aqueous coating composition, from 30% to 90%, from 35% to 80%, or from 40% to 70%.

In addition to the components described above, the aqueous coating composition of the present invention may further comprise any one or combination of the following additives: buffers, neutralizers, dispersants, humectants, biocides, anti-skinning agents, colorants, flowing agents, antioxidants, plasticizers, leveling agents, thixotropic agents, adhesion promoters, anti-scratch additives, and grind vehicles. When present, these additives may be present in a combined amount of from 0 to 10%, from 0.1% to 6%, or from 0.2% to 4%, by weight based on the total weight of the aqueous coating composition.

The aqueous coating composition of the present invention may be prepared with techniques known in the coating art. The process of preparing the aqueous coating composition may comprise admixing the aqueous polymer dispersion with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the aqueous coating composition may be dried, or be allowed to dry, at 5-25° C., or at an elevated temperature, for example, from 35 to 60° C. to form a film (this is, coating). The aqueous coating composition of the present invention can provide the coating made therefrom with improved water repellency and better hydrophobic stain resistance without compromising hydrophilic stain resistance, as compared to coating compositions that do not comprise the aqueous polymer dispersion of the present invention.

The aqueous coating composition of the present invention can be applied to, and adhered to, various substrates. Examples of suitable substrates include concrete, cementious substrates, wood, metals, stones, elastomeric substrates, glass or fabrics. The coating composition is suitable for various coating applications, such as architecture coatings, marine and protective coatings, automotive coatings, wood coatings, coil coatings, and civil engineering coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified.

Methyl methacrylate (MMA), styrene (ST), butyl acrylate (BA), and acrylic acid (AA) are all available from Shanghai Lang Yuan Chemical Co., Ltd.

Sodium p-Styrene Sulfonate (SSS) is available from Shanghai Chemical Reagent Co., Ltd.

Phosphoethyl methacrylate (PEM) is available from Solvay.

Polyglycol P-4000 ("P-4000"), available from The Dow Chemical Company, is a polypropylene glycol having a molecular weight of 4000.

Polybutylene glycol ("B-4000") with a weight average molecular weight of 3830 as measured by GPC analysis is available from The Dow Chemical Company.

Poly(butylene oxide$_{4000}$-co-ethylene oxide$_{200}$) ("BE05") and Poly(butylene oxide$_{4000}$-co-ethylene oxide$_{400}$) ("BE10") were prepared as described below.

MARANIL A19 IS surfactant ("A-19 surfactant", solids: 19%), available from Cognis, is sodium dodecyl (Linear) benzene sulfonate.

Ammonia persulfate ("APS") used as an initiator, NaBS (sodium bisulfate, solids: 99.8%) used as a cofeed activator, tert-Butyl hydroperoxide ("t-BHP") (solids: 70%) used as a chaser catalyst, and isoascorbic acid ("IAA") used as a chase activator, are all available from Shanghai Chemical Reagent Co., Ltd.

Ammonia (25%) is used as a neutralizer.

TEGO 825 defoamer is available from Evonik.

NATROSOL 250 HBR ("250 HBR"), available from Ashland Aqualon Company, is a rheology modifier.

Nopco NXZ defoamer is available from Nopco Company.

OROTAN™ CA-2500 Dispersant ("CA-2500"), available from The Dow Chemical Company, is a hydrophobic type dispersant.

AMP-95, available from ANGUS Chemical Company, is 2-amino-2-methyl-1-propanol and used as a neutralizer.

Ti-Pure R-706, available from The Chemours Company, is titanium dioxide ($TiO_2$).

CC-1500, available from Guangfu Building Materials Group (China), is calcium carbonate.

TEXANOL Ester Alcohol, available from Eastman Chemical Company, is trimethylpentanediol isobutyrate.

ROPAQUE Ultra E Opaque Polymer ("Ultra E polymer") is available from The Dow Chemical Company.

ACRYSOL™ RM-8W ("RM-8W") and ACRYSOL RM-2020 ("RM-2020") Rheology Modifiers, available from The Dow Chemical Company, are both hydrophobically modified ethylene oxide urethane rheology modifiers.

ACRYSOL and OROTAN are trademarks of The Dow Chemical Company.

The following standard analytical equipment and methods are used in the Examples.

Water Repellency of Dry Coatings

Water repellency evaluates the difficulty of wetting the coating surface for water. To determine the water repellency, a test paint was casted on black vinyl charts P-121-10N (Leneta), or on the substrate of ceramic, metal, plastic, and cementitious panel, and allowed to dry at 20-25° C. for various time (e.g., 2 hours or 3 days), respectively. The coated charts were kept vertically so that water drops were allowed to flow from the upper to the bottom side of the coated surface of the charts. Water repellency were observed by the naked eye and represented by water repellency scores shown in Table 1 below. The higher the score, the better the water repellency.

TABLE 1

Water repellency

| Score | State |
|---|---|
| 10 | No wetting nor adhesion of water droplets observed on the coating surface |
| 8 | 1/3 wetting area observed by individual small circular water |
| 6 | 3/4 wetting area observed by individual small circular water |
| 5 | Wetting observed by individual small circular water droplets observed on the coating surface |
| 4 | Wetting observed by individual small elliptic water droplets observed on the coating surface |
| 3 | Wetting observed by individual large water droplets observed on the coating surface |
| 2 | Wetting observed along the discrete track of water on the coating surface |
| 1 | Wetting observed along the thinner track of water on the coating surface |
| 0 | Wetting observed along the entire track of water on coating surface |

Stain Resistance

To test stain resistance performance of coatings, a test paint was coated on Leneta P-121-10N black vinyl charts with wet film thickness of 7 Mil. The coating films were allowed to dry for 7 days in a constant temperature room (CTR, 25° C., 50% relative humidity). Different stains (including hydrophilic & hydrophobic stains listed in Tables 5 and 6) were then applied across the surface of the coating films, respectively, allowing the stains to soak into the films for 3 hours. Then the stain removal test was conducted on a modified scrub machine with a boat filled with a 3M commercial sponge saturated with 1% household detergent solution. 1 kilogram weight was placed on the boat to ensure that all the samples were tested under the same pressure. Each sample was washed using the 3M sponge described above for 100 cycles. Before ranking for stain resistance, the sample charts were rinsed using water followed by complete drying at room temperature. Stain performance was evaluated by visual ranking percentages of stain removal by comparing with the unscrubbed side, based on the standard described in Table 2.

TABLE 2

Ranking standard for stain resistance performance

| Stain resistance ranking | Stain removal |
|---|---|
| 10 | No stain or trace stains left |
| 9 | More than 90% stain removed |
| 8 | 80% to 89% stain removed |
| 7 | 70% to 79% stain removed |
| 6 | 60% to 69% stain removed |
| 5 | 50% to 59% stain removed |
| 4 | 40% to 49% stain removed |
| 3 | 20% to 39% stain removed |
| 2 | Less than 20% stain removed or obvious stain marks left |
| 1 | Almost no stain removed |

Synthesis of Poly(butylene oxide$_{4000}$-co-ethylene oxide$_{200}$) ("BE05)

B-4000 polybutylene glycol (1424.6 g) and KOH (50% aqueous solution, 6.0 g) as a catalyst were added into a reactor and heated to 60° C. with stirring. Then, dehydration under vacuum was conducted with stirring at temperatures gradually increased from 60° C. to 80° C. during one hour, followed by heating to 115° C. Ethylene oxide (70 g) was fed into the reactor and the reaction continued until the pressure in the reactor became stable for 2 hours. The reaction temperature was decreased to 60° C. to give BE05 polymer (790.5 g).

Synthesis of Poly(butylene oxide$_{4000}$-co-ethylene oxide$_{400}$) ("BE10")

The above obtained BE05 polymer in a reactor was heated to 120° C. Ethylene oxide (40 g) was then fed into the reactor. The reaction continued until the pressure in the reactor became stable for 2 hours. The reactor was then cooled down to 60° C. followed by purging nitrogen into the reactor to remove any trace of unreacted ethylene oxide. Then, the reactor was cooled down to 40° C. to give BE10 polymer.

Gel Permeation Chromatography (GPC)

The molecular weight of a sample (e.g., polyglycols, polyols, etc.) was determined by GPC. The GPC analysis was calibrated using a polyol mixture (1.5% by weight in tetrahydrofuran (THF)) and the calibrated molecular weight Mw calculation was based on a broad standard method. The polyol mixture was obtained by adding 15 milligrams of VORANOL™ CP6001, VORANOL CP4100, VORANOL P2000, and VORANOL CP1000 (all available from The Dow Chemical Company) in 1 g of THF (VORANOL is a trademark of The Dow Chemical Company).

150±20 mg of sample was weighed into a 20 mL vial and 10 mL THF (HPLC grade, LabScan) was added. The vials were sealed with butyl rubber septum and the vials were shaken. Instrumental conditions are given in the table below:

| GPC conditions | | | |
|---|---|---|---|
| HPLC system | | Settings | |
| Degasser | Agilent G1379A; 2 channels in series | | |
| Pump/eluent | Agilent 1100 G1310A; isocratic/THF | Flow (ml/min) | 1 |
| Autosampler | Agilent 1100 G1313A | Injection volume (µl) | 50 |
| Column oven | Shimadzu column box CTO-10A VP | Oven temperature (° C.) | 35 |
| Column | Series of 4 PL-Gel (7 mm × 30 cm × 5 µm) columns, each filled with PS/DVB (poly(styrene-co-divinylbenzene)) of 50, 100, 500 and 1000 Å | | |
| Refractive Index (RI) Detector | Agilent 1100 Differential Refractive Index Detector G1362A | Peak width (min) | >0.2 |
| | | RI temperature (° C.) | 35 |

Example (Ex) 1

Firstly, a monomer mixture was prepared by mixing 502.00 grams (g) of deionized (DI) water, 91.88 g of A-19 surfactant (19%), 5.39 g of SSS (90.5%), 914.65 g of BA, 668.98 g of MMA, 24.75 g of AA, and 11.70 g of PEM.

Into a 1 gallon vessel, equipped with a reflux condenser, addition funnels and a stirrer, an initial water charge was added with agitation at 130 rpm. The reaction vessel was heated to 88° C. 6.18 g of A-19 surfactant (19%) was added into the vessel. 81.26 g of B-4000 was mixed with 98.58 g of the above monomer mixture. Then the resulting mixture and an initial catalyst solution (5.81 g of APS in 16.65 g of DI water) were charged to the reaction vessel. The reaction mixture was held for 5 minutes for seed formation at 82-88° C. Then the remainder of the monomer mixture, a catalyst (2.32 g of APS in 63.11 g of DI water) and an activator (2.46 g of NaBS in 63.11 g of DI water) were added over a period of 90 minutes with temperature between 85° C. and 87° C. After completing addition of the monomer mixture, the catalyst and the activator, the contents in the reaction vessel were cooled to room temperature. During cooling, a mixture of 3.80 g of t-BHP in 25.84 g of DI water, and 1.80 g of IAA in 28.20 g of DI water was added when the temperature was at 65° C. When the vessel temperature reached 50° C. or below, 16.15 g of ammonia was added to adjust the pH of the obtained dispersion over 7. The resultant polymer dispersion contained, by weight based on the total weight of monomers, 5.00% of B-4000 and a polymer of 41.48% MMA/56.00% BA/0.72% PEM/0.30% SSS/1.50% AA.

Ex 2

Firstly, a monomer mixture was prepared by mixing 502.00 g of DI water, 91.88 g of A-19 surfactant (19%), 5.39 g of SSS (90.5%), 914.65 g of BA, 668.98 g of MMA, 24.75 g of AA, 11.70 g of PEM, and 81.26 g of B-4000.

Into a 1 gallon vessel, equipped with a reflux condenser, addition funnels and a stirrer, an initial water charge was added with agitation at 130 rpm. The reaction vessel was heated to 88° C. 6.18 g of A-19 surfactant (19%) was added into the vessel. 101.64 g of the monomer mixture and an initial catalyst solution (5.81 g of APS in 16.65 g of DI water) were charged to the reaction vessel. The reaction mixture was held for 5 minutes for seed formation at 82-88° C. Then the remainder of the monomer mixture, a catalyst (2.32 g of APS in 63.11 g of DI water) and an activator (2.46 g of NaBS in 63.11 g of DI water) were added over a period of 90 minutes with temperature between 85° C. and 87° C. After completing addition of the monomer mixture, the catalyst and the activator, the contents in the reaction vessel were cooled to room temperature. During cooling, a mixture of 3.80 g of t-BHP in 25.84 g of DI water, and 1.80 g of IAA in 28.20 g of DI water was added when the temperature was at 65° C. When the vessel temperature reached 50° C. or below, 16.15 g of ammonia was added to adjust the pH of the obtained dispersion over 7. The resultant polymer dispersion contained, by weight based on the total weight of monomers, 5.00% of B-4000 and a polymer of 41.48% MMA/56.00% BA/0.72% PEM/0.30% SSS/1.50%.

Ex 3

Firstly, a monomer mixture was prepared by mixing 502.00 g of DI water, 91.88 g of A-19 surfactant (19%), 5.39 g of SSS (90.5%), 914.65 g of BA, 668.98 g of MMA, 24.75 g of AA, 11.70 g of PEM, and 162.52 g of B-4000.

Into a 1 gallon vessel, equipped with a reflux condenser, addition funnels and a stirrer, an initial water charge was added with agitation at 130 rpm. The reaction vessel was heated to 88° C. 6.18 g of A-19 surfactant (19%) was added into the vessel. 105.22 g of the monomer mixture and an initial catalyst solution (5.81 g of APS in 16.65 g of DI water) were charged to the reaction vessel. The reaction mixture was held for 5 minutes for seed formation at 82-88° C. Then the remainder of the monomer mixture, a catalyst (2.32 g of APS in 63.11 g of DI water) and an activator (2.46 g of NaBS in 63.11 g of DI water) were added over a period of 90 minutes with temperature between 85° C. and 87° C. After completing addition of the monomer mixture, the catalyst and the activator, the contents in the reaction vessel were cooled to room temperature. During cooling, a mixture of 3.80 g of t-BHP in 25.84 g of DI water, and 1.80 g of IAA in 28.20 g of DI water was added when the temperature was at 65° C. When the vessel temperature reached 50° C. or below, 16.15 g of ammonia was added to adjust the pH of the obtained dispersion over 7. The resultant polymer dispersion contained, by weight based on the total weight of monomers, 10.00% of B-4000 and a polymer of 41.48% MMA/56.00% BA/0.72% PEM/0.30% SSS/1.50% AA.

Ex 4

Firstly, a monomer mixture was prepared by mixing 502.00 g of DI water, 91.88 g of A-19 surfactant (19%), 5.39 g of SSS (90.5%), 914.65 g of BA, 668.98 g of MMA, 24.75 g of AA, 11.70 g of PEM, and 325.04 g of B-4000.

Into a 1 gallon vessel, equipped with a reflux condenser, addition funnels and a stirrer, an initial water charge was added with agitation at 130 rpm. The reaction vessel was heated to 88° C. 6.18 g of A-19 surfactant (19%) was added into the vessel. 112.37 g of the monomer mixture and an initial catalyst solution (5.81 g of APS in 16.65 g of DI water) were charged to the reaction vessel. The reaction mixture was held for 5 minutes for seed formation at 82-88° C. Then the remainder of the monomer mixture, a catalyst (2.32 g of APS in 63.11 g of DI water) and an activator (2.46 g of NaBS in 63.11 g of DI water) were added over a period of 90 minutes with temperature between 85° C. and 87° C. After completing addition of the monomer mixture, the catalyst and the activator, the contents in the reaction vessel were cooled to room temperature. During cooling, a mixture of 3.80 g of t-BHP in 25.84 g of DI water, and 1.80 g of IAA in 28.20 g of DI water was added when the temperature was at 65° C. When the vessel temperature reached 50° C. or below, 16.15 g of ammonia was added to adjust the pH of the obtained dispersion over 7. The resultant polymer dispersion contained, by weight based on the total weight of monomers, 20.00% of B-4000 and a polymer of 41.48% MMA/56.00% BA/0.72% PEM/0.30% SSS/1.50% AA.

Ex 5

Firstly, a monomer mixture was prepared by mixing 502.00 g of DI water, 91.88 g of A-19 surfactant (19%), 5.39 g of SSS (90.5%), 914.65 g of BA, 668.98 g of ST, 24.75 g of AA, 11.70 g of PEM, and 81.26 g of B-4000.

Into a 1 gallon vessel, equipped with a reflux condenser, addition funnels and a stirrer, an initial water charge was added with agitation at 130 rpm. The reaction vessel was heated to 88° C. 6.18 g of A-19 surfactant (19%) was added into the vessel. 101.64 g of the monomer mixture and an initial catalyst solution (5.81 g of APS in 16.65 g of DI water) were charged to the reaction vessel. The reaction mixture was held for 5 minutes for seed formation at 82-88° C. Then the remainder of the monomer mixture, a catalyst (2.32 g of APS in 63.11 g of DI water) and an activator (2.46 g of NaBS in 63.11 g of DI water) were added over a period of 120 minutes with temperature between 85° C. and 87° C. After completing addition of the monomer mixture, the catalyst and the activator, the contents in the reaction vessel were cooled to room temperature. During cooling, a mixture of 3.80 g of t-BHP in 25.84 g of DI water, and 1.80 g of IAA in 28.20 g of DI water was added when the temperature was at 65° C. When the vessel temperature reached 50° C. or below, 16.15 g of ammonia was added to adjust the pH of the obtained dispersion over 7. The resultant polymer dispersion contained, by weight based on the total weight of monomers, 5.00% of B-4000 and a polymer of 41.48% ST/56.00% BA/0.72% PEM/0.30% SSS/1.50% AA.

Comparative (Comp) Ex A

Firstly, a monomer mixture was prepared by mixing 502.00 g of DI water, 91.88 g of A-19 surfactant (19%), 5.39 g of SSS (90.5%), 914.65 g of BA, 668.98 g of MMA, 24.75 g of AA, and 11.70 g of PEM.

Into a 1 gallon vessel, equipped with a reflux condenser, addition funnels and a stirrer, an initial water charge was added with agitation at 130 rpm. The reaction vessel was heated to 88° C. 6.18 g of A-19 surfactant (19%) was added into the vessel. 98.58 g of the monomer mixture and an initial catalyst solution (5.81 g of APS in 16.65 g of DI water) were charged to the reaction vessel. The reaction mixture was held for 5 minutes for seed formation at 82-88° C. Then the remainder of the monomer mixture, a catalyst (2.32 g of APS in 63.11 g of DI water) and an activator (2.46 g of NaBS in 63.11 g of DI water) were added over a period of 90 minutes with temperature between 85° C. and 87° C. After completing addition of the monomer mixture, the catalyst and the activator, the contents in the reaction vessel were cooled to room temperature. During cooling, a mixture of 3.80 g of t-BHP in 25.84 g of DI water, and 1.80 g of IAA in 28.20 g of DI water was added when the temperature was at 65° C. When the vessel temperature reached 50° C. or below, 16.15 g of ammonia was added to adjust the pH of the obtained dispersion over 7. The resultant polymer dispersion contained a polymer of 41.48% MMA/56.00% BA/0.72% PEM/0.30% SSS/1.50% AA, by weight based on the total weight of monomers.

Comp Ex B

Comp Ex B dispersion was prepared according to the same procedure as described above in preparing Ex 1 dispersion except that B-4000 in Ex 1 was replaced by P-4000. The resultant polymer dispersion contained, by weight based on the total weight of monomers, 5.00% of P-4000 and a polymer of 41.48% MMA/56.00% BA/0.72% PEM/0.30% SSS/1.50% AA.

Comp Ex C

Comp Ex C dispersion was prepared according to the same procedure as described above in preparing Ex 2 dispersion except that B-4000 in Ex 2 was replaced by P-4000. The resultant polymer dispersion contained, 5.00% of P-4000 and a polymer of 41.48% MMA/56.00% BA/0.72% PEM/0.30% SSS/1.50% AA, by weight based on the total weight of monomers.

Comp Ex D

Firstly, two monomer mixtures were prepared as follows,
Monomer mixture I: mixing 251.00 g of DI water, 45.94 g of A-19 surfactant (19%), 2.7 g of SSS (90.5%), 457.33 g of BA, 334.49 g of MMA, 12.38 g of AA, 5.85 g of PEM, and 81.26 g of P-4000.

Monomer mixture II: mixing 251.00 g of DI water, 45.94 g of A-19 surfactant (19%), 2.7 g of SSS (90.5%), 457.33 g of BA, 334.49 g of MMA, 12.38 g of AA, and 5.85 g of PEM.

Into a 1 gallon vessel, equipped with a reflux condenser, addition funnels and a stirrer, an initial water charge was added with agitation at 130 rpm. The reaction vessel was heated to 88° C. 6.18 g of A-19 surfactant (19%) was added into the vessel. 103.50 g of the monomer mixture I and an initial catalyst solution (5.81 g of APS in 16.65 g of DI water) were charged to the reaction vessel. The reaction mixture was held for 5 minutes for seed formation at 82-88° C. Then the remainder of the monomer mixture I, the first 50% of a catalyst (2.32 g of APS in 63.11 g of DI water) and the first 50% of an activator (2.46 g of NaBS in 63.11 g of DI water) were added over a period of 45 minutes with temperature between 85° C. and 87° C. After completing addition of the monomer mixture I, the monomer mixture II, together with the second 50% of the catalyst and activator, was added over another period of 45 minutes with temperature between 85° C. and 87° C. After completing addition of the monomer mixture II, the contents in the reaction vessel were cooled to room temperature. During cooling, a mixture of 3.80 g of t-BHP in 25.84 g of DI water, and 1.80 g of IAA in 28.20 g of DI water were added when the temperature was at 65° C. When the vessel temperature reached 50° C. or below, 16.15 g of ammonia was added to adjust the pH of the obtained dispersion over 7. The resultant polymer dispersion contained, 5.00% of P-4000 and a polymer of 41.48% MMA/56.00% BA/0.72% PEM/0.30% SSS/1.50% AA, by weight based on the total weight of monomer.

Comp Ex E

Firstly, a monomer mixture was prepared by mixing 502.00 g of DI water, 91.88 g of A-19 surfactant (19%), 5.39 g of SSS (90.5%), 914.65 g of BA, 680.33 g of MMA, 32.99 g of AA, and 81.26 g of B-4000.

Into a 1 gallon vessel, equipped with a reflux condenser, addition funnels and a stirrer, an initial water charge was added with agitation at 130 rpm. The reaction vessel was heated to 88° C. 8.55 g of A-19 surfactant (19%) was added into the vessel. 100.13 g of the monomer mixture and an initial catalyst solution (5.81 g of APS in 16.65 g of DI water) were charged to the reaction vessel. The reaction mixture was held for 5 minutes for seed formation at 82-88° C. Then the remainder of the monomer mixture, a catalyst (2.32 g of APS in 63.11 g of DI water) and an activator (2.46 g of NaBS in 63.11 g of DI water) were added over a period of 90 minutes with temperature between 85° C. and 87° C. After completing addition of the monomer mixture, the catalyst and the activator, the contents in the reaction vessel were cooled to room temperature. During cooling, a mixture of 3.80 g of t-BHP in 25.84 g of DI water, and 1.80 g of IAA in 28.20 g of DI water was added when the temperature was at 65° C. When the vessel temperature reached 50° C. or below, 16.15 g of ammonia was added to adjust the pH of the obtained dispersion over 7. The resultant polymer dispersion contained, by weight based on the total weight of monomers, 5.00% of B-4000 and a polymer of 41.70% MMA/56.00% BA/0.30% SSS/2.00% AA.

Comp Ex F

Comp Ex F dispersion was prepared according to the same procedure as described above in preparing Ex 2 dispersion except that B-4000 in Ex 2 was replaced by BE05. The resultant polymer dispersion contained, by weight based on the total weight of monomers, 5.00% of BE05 and a polymer of 41.48% MMA/56.00% BA/0.72% PEM/0.30% SSS/1.50% AA.

Comp Ex G

Comp Ex G dispersion was prepared according to the same procedure as described above in preparing Ex 2 dispersion except that B-4000 in Ex 2 was replaced by BE10. The resultant polymer dispersion contained, by weight based on the total weight of monomers, 5.00% of BE10 and a polymer of 41.48% MMA/56.00% BA/0.72% PEM/0.30% SSS/1.50% AA.

Properties of the obtained dispersions are given in Table 3. Dispersions of Exs 1-5 were all homogenous and stable, that is, no observed bleed out of B-4000 on the surface after storage at room temperature for 1 month or longer, or even after heatage at 50° C. for 10 days.

TABLE 3

Physical properties of Dispersions

| Dispersion | pH | Viscosity/cps | Particle Size/nm | Solid/% | Tg/° C. |
|---|---|---|---|---|---|
| Ex 1 | 7.82 | 238 | 122 | 48.30 | −4.27** |
| Ex 2 | 7.90 | 51 | 143 | 48.40 | −4.27** |
| Ex 3 | 7.88 | 229 | 127 | 49.90 | 3.5* |
| Ex 4 | 8.23 | 306 | 133 | 51.68 | −4.27** |
| Ex 5 | 7.87 | 427 | 109 | 48.88 | −5.33** |
| Comp Ex A | 7.81 | 181 | 137 | 47.25 | 6* |
| Comp Ex B | 7.86 | 205 | 132 | 47.64 | −4.27** |
| Comp Ex C | 7.91 | 171 | 143 | 47.90 | −4.27** |
| Comp Ex D | 8.56 | 217 | 139 | 48.43 | −4.27** |
| Comp Ex E | 7.86 | 255 | 127 | 49.67 | −4.27** |
| Comp Ex F | 8.14 | 217 | 130 | 49.00 | −4.27** |
| Comp Ex G | 8.20 | 199 | 133 | 48.33 | −4.27** |

*Tg was measured by DSC. A 5-10 milligram (mg) sample was analyzed in a sealed aluminum pan on a TA Instrument DSC Q2000 fitted with an auto-sampler under nitrogen atmosphere. Tg measurement by DSC was with three cycles including, from −60 to 150° C., 10° C./min (1$^{st}$ cycle, then hold for 5 minutes to erase thermal history of the sample), from 150 to −60° C., 10° C./min (2$^{nd}$ cycle), and from −60 to 150° C., 10° C./min (3$^{rd}$ cycle). Tg was obtained from the 3$^{rd}$ cycle by "half height" method.
**Tg was calculated by the Fox Tg equation described above.

Paint Formulations

The above obtained dispersions were used as binders in preparing paint formulations. These paint formulations (45% PVC) were prepared based on formulations given in Tables 4 and 5. The paints were made through a two-stage process. In the first grinding stage, water, the dispersant, the wetting agent, the defoamer and the thickener were added in a can, then TiO$_2$ and other extenders were gradually added with high speed dispersing. After all materials in the grind were added, the grind was dispersed at a speed of 2000 rpm for another 2 to 4 hours to get a well dispersed slurry. In the second letdown stage, the binder, the coalescent, the thickener, the defoamer and other additives were added into the slurry. The obtained paints were evaluated for water repellency and stain resistance properties according to the test methods described above and results are given in Tables 6 and 7.

TABLE 4

Paint formulations, gram

| Paint | Paint 1 | Paint 2 | Paint 3 | Paint 4 | Paint 5 |
|---|---|---|---|---|---|
| Grind | | | | | |
| Water | 180 | 180 | 180 | 180 | 180 |
| 250 HBR | 1 | 1 | 1 | 1 | 1 |
| Nopco NXZ | 2 | 2 | 2 | 2 | 2 |
| CA-2500 | 13 | 13 | 13 | 13 | 13 |
| AMP-95 | 1 | 1 | 1 | 1 | 1 |
| TiO$_2$ | 230 | 230 | 230 | 230 | 230 |
| CC-1500 | 95 | 95 | 95 | 95 | 95 |
| Grind Sub-total | 522 | 522 | 522 | 522 | 522 |
| LetDown | | | | | |
| Binder Dosage | 330.7 | 330 | 319.4 | 308.4 | 326.1 |
| Binder Type | Ex 1 | Ex 2 | Ex 3 | Ex 4 | Ex 5 |
| Propylene Glycol | 15 | 15 | 15 | 15 | 15 |
| TEXANOL | 10.5 | 10.5 | 10.5 | 10.5 | 10.5 |
| Ultra E polymer | 50 | 50 | 50 | 50 | 50 |
| Nopco NXZ | 1 | 1 | 1 | 1 | 1 |
| RM-8W | 4.6 | 3.8 | 4.6 | 4.6 | 4.6 |
| RM-2020 | 10 | 10 | 10 | 10 | 10 |
| Water | 56.2 | 57.7 | 66.6 | 77.6 | 59.9 |
| Total | 1000 | 1000 | 1000 | 1000 | 1000 |

TABLE 5

Paint formulations, gram

| Paint | Paint A | Paint B | Paint C | Paint D | Paint E | Paint F | Paint G |
|---|---|---|---|---|---|---|---|
| Grind | | | | | | | |
| Water | 180 | 180 | 180 | 180 | 180 | 180 | 180 |
| 250 HBR | 1 | 1 | 1 | 1 | 1 | 1 | 1 |
| Nopco NXZ | 2 | 2 | 2 | 2 | 2 | 2 | 2 |
| CA-2500 | 13 | 13 | 13 | 13 | 13 | 13 | 13 |
| AMP-95 | 1 | 1 | 1 | 1 | 1 | 1 | 1 |
| TiO$_2$ | 230 | 230 | 230 | 230 | 230 | 230 | 230 |
| CC-1500 | 95 | 95 | 95 | 95 | 95 | 95 | 95 |
| Grind Sub-total | 522 | 522 | 522 | 522 | 522 | 522 | 522 |
| LetDown | | | | | | | |
| Binder Dosage | 338 | 335.3 | 333.4 | 329.8 | 320.8 | 325.8 | 330.3 |
| Binder Type | Comp Ex A | Comp Ex B | Comp Ex C | Comp Ex D | Comp Ex E | Comp Ex F | Comp Ex G |
| Propylene Glycol | 15 | 15 | 15 | 15 | 15 | 15 | 15 |
| TEXANOL | 10.5 | 10.5 | 10.5 | 10.5 | 10.5 | 10.5 | 10.5 |
| Ultra E polymer | 50 | 50 | 50 | 50 | 50 | 50 | 50 |
| Nopco NXZ | 1 | 1 | 1 | 1 | 1 | 1 | 1 |

TABLE 5-continued

| | Paint formulations, gram | | | | | | |
|---|---|---|---|---|---|---|---|
| Paint | Paint A | Paint B | Paint C | Paint D | Paint E | Paint F | Paint G |
| RM-8W | 5.8 | 5.8 | 5.2 | 5.4 | 5.4 | 5.4 | 5.4 |
| RM-2020 | 10 | 10 | 10 | 10 | 10 | 10 | 10 |
| Water | 47.7 | 50.4 | 52.8 | 56.3 | 65.3 | 60.3 | 55.8 |
| Total | 1000 | 1000 | 1000 | 1000 | 1000 | 1000 | 1000 |

As shown in Tables 6 and 7, paints (Paints 1-5) comprising inventive binders showed better water repellency (after 3-day drying) than all comparative paints. In addition, binders comprising both poly(butylene oxide) and polymerized units of PEM provided paints with significantly improved hydrophobic stain resistance without compromising hydrophilic stain resistance, as compared to binders comprising polymerized units of PEM or poly(butylene oxide) alone (Paints A and E). In contrast, binders comprising both polypropylene oxide and polymerized units of PEM provided paints with poor water repellency although acceptable stain resistance performance (Paints B-D). Incorporation of the copolymer of butylene oxide (BO) and ethylene oxide (EO) with different BO/EO ratios (Paints F and G) significantly compromised both water repellency and hydrophobic stain resistance. It is obvious that the combination of poly(butylene oxide) and polymerized units of PEM has a synergistic effect in improving both water repellency and stain resistance.

TABLE 6

| | Properties of Inventive Paints | | | | |
|---|---|---|---|---|---|
| Paint Binder Type | Paint 1 Ex 1 | Paint 2 Ex 2 | Paint 3 Ex 3 | Paint 4 Ex 4 | Paint 5 Ex 5 |
| | Water repellency | | | | |
| After 2-hour drying | 1.0 | 2.0 | 3.0 | 2.0 | 3.0 |
| After 3-day drying | 4.0 | 4.0 | 4.0 | 6.0 | 4.0 |
| | Hydrophilic stain resistance | | | | |
| Red wine | 9.0 | 9.0 | 9.0 | 9.0 | 9.0 |
| Coffee | 7.0 | 7.0 | 7.0 | 7.0 | 8.0 |
| Yellow tea | 8.0 | 8.0 | 8.0 | 8.0 | 8.0 |
| Green tea | 6.5 | 7.5 | 7.5 | 7.5 | 8.5 |
| Blue ink | 6.5 | 6.0 | 6.0 | 6.0 | 7.0 |
| Total | 37.0 | 37.5 | 37.5 | 37.5 | 40.5 |
| | Hydrophobic stain resistance | | | | |
| Mark pen | 6.0 | 6.0 | 6.0 | 6.0 | 6.0 |
| Pencil | 4.0 | 4.0 | 4.0 | 2.0 | 4.0 |
| Ball point pen | 2.0 | 2.0 | 2.0 | 2.0 | 1.0 |
| Crayon | 5.0 | 5.0 | 6.0 | 5.0 | 5.0 |
| Total | 17.0 | 17.0 | 18.0 | 15.0 | 16.0 |

TABLE 7

| | Properties of Comparative Paints | | | | | | |
|---|---|---|---|---|---|---|---|
| | Paint | | | | | | |
| | Paint A | Paint B | Paint C | Paint D | Paint E | Paint F | Paint G |
| | Binder Type | | | | | | |
| | Comp Ex A | Comp Ex B | Comp Ex C | Comp Ex D | Comp Ex E | Comp Ex F | Comp Ex G |
| | Water repellency | | | | | | |
| After 2-hour drying | 0.0 | 0.0 | 0.0 | 0.0 | 1.0 | 1.0 | 1.0 |
| After 3-day drying | 0.0 | 1.0 | 2.0 | 2.0 | 3.0 | 2.0 | 2.0 |
| | Hydrophilic stain resistance | | | | | | |
| Red wine | 9.0 | 9.0 | 9.0 | 9.0 | 9.0 | 9.0 | 9.0 |
| Coffee | 7.0 | 7.0 | 7.0 | 6.5 | 7.0 | 7.0 | 7.0 |
| Yellow tea | 8.0 | 8.0 | 8.0 | 8.0 | 8.0 | 8.0 | 8.0 |
| Green tea | 7.0 | 7.5 | 6.5 | 6.5 | 7.0 | 7.0 | 7.0 |
| Blue ink | 7.0 | 7.0 | 6.5 | 6.5 | 5.5 | 5.5 | 5.5 |
| Total | 38.0 | 38.5 | 37.0 | 36.5 | 36.5 | 36.5 | 36.5 |
| | Hydrophobic stain resistance | | | | | | |
| Mark pen | 4.0 | 6.0 | 6.0 | 6.0 | 6.0 | 6.0 | 6.0 |
| Pencil | 4.0 | 4.0 | 4.0 | 4.0 | 4.0 | 4.0 | 4.0 |
| Ball point pen | 2.0 | 2.0 | 2.0 | 2.0 | 2.0 | 2.0 | 2.0 |
| Crayon | 2.0 | 5.0 | 5.0 | 6.0 | 1.0 | 1.5 | 2.0 |
| Total | 12.0 | 17.0 | 17.0 | 18.0 | 13.0 | 13.5 | 14.0 |

In addition, hiding, L, a, and b values, and gloss properties were also evaluated for some paints and results are given in Table 8. As shown in Table 8, binders containing both poly(butylene oxide) and polymerized units of PEM (Exs 1-2) provided paints with comparable hiding, L, a and b values, and gloss performance, as compared to binders in Paints A-D. It indicates that the incorporation of poly(butylene oxide) during polymerization in the binder did not hurt these properties (e.g., hiding, coloring, and gloss) of the obtained paints.

TABLE 8

Hiding, Lab, and gloss properties of paints

| | Paint ID | | | | | |
|---|---|---|---|---|---|---|
| | Paint A | Paint B | Paint C | Paint D | Paint 1 | Paint 2 |
| | Binder Type | | | | | |
| | Comp Ex A | Comp Ex B | Comp Ex C | Comp Ex D | Ex 1 | Ex 2 |
| Hiding | | | | | | |
| Contrast ratio | 95.8% | 95.7% | 95.5% | 95.4% | 95.8% | 95.8% |
| Y value | 92.5% | 92.4% | 92.2% | 92.1% | 91.9% | 92.2% |
| Lab | | | | | | |
| L | 97.0 | 97.0 | 96.9 | 96.9 | 96.8 | 96.9 |
| a | −0.5 | −0.5 | −0.4 | −0.4 | −0.5 | −0.5 |
| b | 0.9 | 0.9 | 0.9 | 0.9 | 0.9 | 0.9 |
| Gloss | | | | | | |
| 20° | 1.8 | 1.8 | 1.7 | 1.7 | 1.6 | 1.6 |
| 60° | 9.8 | 9.2 | 9.2 | 9.0 | 8.3 | 7.8 |
| 85° | 26.7 | 18.0 | 25.6 | 25.2 | 25.4 | 25.5 |

Comp Ex H

B-4000 was added, in an amount of 5% by weight based on the solids weight of Comp Ex A binder, into Comp Ex A binder at room temperature with stirring for 30 minutes. A large amount of bleed out of B-4000 was immediately observed on the surface (that is, polybutylene glycol floated on the surface), indicating that B-4000 cannot be well dispersed in the binder.

Comp Ex I

B-4000 was added, in an amount of 5% by weight based on the solids weight of Comp Ex A binder, into Comp Ex A binder at 50° C. with stirring for 30 minutes, then cooled down to room temperature overnight. Then, a large amount of bleed out of B-4000 was observed on the surface (that is, polybutylene glycol floated on the surface), indicating that B-4000 cannot be well dispersed in the binder.

Comp Ex J

B-4000 was added, in an amount of 5% by weight based on the solids weight of Comp Ex A, into Paint A at room temperature with stirring for 30 minutes and left overnight. Then, a large amount of bleed out of B-4000 was observed on the surface (that is, polybutylene glycol floated on the surface), indicating that B-4000 cannot be well dispersed in the paint.

As shown in Comp Exs H-J, post adding B-4000 after polymerization process of the binder was difficult to obtain homogenous and stable dispersions or paints.

What is claimed is:

1. A process of preparing an aqueous polymer dispersion, comprising:
   polymerization of a monomer composition in an aqueous medium in the presence of a poly(butylene oxide) polymer to obtain an emulsion polymer,
   wherein the monomer composition comprises an ethylenically unsaturated phosphorous-containing monomer, and
   wherein the poly(butylene oxide) polymer has the structure of formula I,

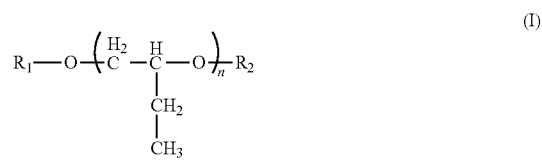

wherein $R_1$ and $R_2$ each independently represents a hydrogen atom or a straight, branched or cyclic, saturated or unsaturated alkyl group having 1 to 22 carbon atoms; and n is an integer of from 5 to 300.

2. The process of claim 1, wherein the poly(butylene oxide) polymer is present in an amount of from 1.5% to 30% by weight, based on the total weight of the monomer composition.

3. The process of claim 1, wherein the monomer composition comprises from 0.1% to 10% by weight of the ethylenically unsaturated phosphorous-containing monomer, based on the total weight of the monomer composition.

4. The process of claim 1, wherein the poly(butylene oxide) polymer has a molecular weight of from 400 to 20,000.

5. The process of claim 1, wherein the poly(butylene oxide) polymer is mixed with the monomer composition prior to or during polymerization of the monomer composition.

6. The process of claim 1, wherein the ethylenically unsaturated phosphorous-containing monomer is selected from the group consisting of phosphoethyl (meth)acrylate, phosphopropyl (meth)acrylate, phosphobutyl (meth)acrylate, and salts thereof.

7. The process of claim 1, wherein the emulsion polymer has a $T_g$ of from −20 to 50° C.

8. The process of claim 1, wherein the aqueous polymer dispersion has a particle size of from 60 nm to 200 nm.

9. An aqueous polymer dispersion obtained from the process of claim 1.

10. An aqueous polymer dispersion, comprising:
    an emulsion polymer comprising, as polymerized units, an ethylenically unsaturated phosphorous-containing monomer; and
    a poly(butylene oxide) polymer having the structure of formula I,

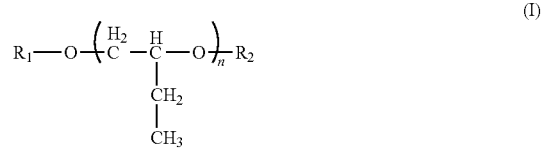

wherein $R_1$ and $R_2$ each independently represents a hydrogen atom or a straight, branched or cyclic, saturated or unsaturated alkyl group having 1 to 22 carbon atoms; and n is an integer of from 5 to 300.

11. An aqueous coating composition comprising the aqueous polymer dispersion of claim 10.

* * * * *